(12) United States Patent
Chen

(10) Patent No.: US 7,265,464 B2
(45) Date of Patent: Sep. 4, 2007

(54) BALANCING STRUCTURE FOR MOTOR

(75) Inventor: Ming-Huang Chen, Kaohsiung (TW)

(73) Assignee: Dahlia Technology Corp., Kaohsiung (TW)

( * ) Notice: Subject to any disclaimer, the term of this patent is extended or adjusted under 35 U.S.C. 154(b) by 76 days.

(21) Appl. No.: 11/157,840

(22) Filed: Jun. 22, 2005

(65) Prior Publication Data
US 2006/0232148 A1 Oct. 19, 2006

(30) Foreign Application Priority Data
Apr. 19, 2005 (TW) ............... 94112419 A

(51) Int. Cl.
H02K 11/00 (2006.01)
H02K 7/20 (2006.01)
H02K 1/12 (2006.01)
H02K 23/66 (2006.01)

(52) U.S. Cl. .............. 310/68 B; 310/51; 310/67 R
(58) Field of Classification Search .......... 310/67 R, 310/68 B, 51, 168, 190–191, 216, 254
See application file for complete search history.

(56) References Cited

U.S. PATENT DOCUMENTS

| 4,594,524 | A | * | 6/1986 | Sudo .................... 310/68 R |
| 4,820,951 | A | * | 4/1989 | Sugiura et al. .......... 310/257 |
| 5,679,997 | A | * | 10/1997 | Matsuzawa et al. ...... 310/254 |
| 6,050,785 | A | * | 4/2000 | Horng .................... 417/354 |
| 6,097,120 | A | | 8/2000 | Horng |
| 6,483,209 | B1 | | 11/2002 | Horng et al. |
| 6,700,241 | B1 | | 3/2004 | Horng et al. |
| 6,727,626 | B2 | * | 4/2004 | Horng et al. ............ 310/190 |
| 2005/0006962 | A1 | | 1/2005 | Horng |

FOREIGN PATENT DOCUMENTS

| JP | 2-214455 | * | 8/1990 | ............ 310/269 |
| TW | 383818 | | 3/2000 | |
| TW | 422365 | | 2/2001 | |
| TW | 428838 | | 4/2001 | |
| TW | M241969 | | 8/2004 | |

* cited by examiner

*Primary Examiner*—Tran Nguyen
(74) *Attorney, Agent, or Firm*—Bacon & Thomas, PLLC

(57) ABSTRACT

A motor includes a fixed portion, a rotor, a balancing plate, and at least one sensor mounted on the fixed portion. The fixed portion includes a stator having at least one winding and a plurality of pole faces. The rotor includes an annular magnet facing the pole faces of the stator and a shaft rotatably extending through the fixed portion. The balancing plate is mounted on the fixed portion and includes at least two magnetically conductive faces that face at least one face of the annular magnet. The balancing plate presses against and thus precisely positions a body of the sensor so that the sensor and the annular magnet have a certain distance therebetween while providing a magnetically attracting balancing effect between the at least two magnetically conductive faces and the annular magnet.

9 Claims, 4 Drawing Sheets

BALANCING STRUCTURE FOR MOTOR

BACKGROUND OF THE INVENTION

1. Field of the Invention

The present invention relates to a balancing structure for a motor. In particular, the present invention relates to a balancing structure for maintaining stable rotation of a rotor of a motor.

2. Description of Related Art

A wide variety of structures for maintaining rotational balance for a rotor of a motor have been proposed. One of these structures comprises a fixed portion, a rotor, an attracting portion, and a magnetically conductive portion. The fixed portion includes a base, an axial tube fixed on the base, a bearing received in the axial tube, a stator, and a circuit board. The stator includes a coil with axial winding or radial winding and a plurality of pole plates (or pole arms). The rotor includes a shaft rotatably extending through the bearing and an annular magnet surrounding the pole faces of the pole plates. The attracting portion is provided on a bottom of the rotor or a top end of the axial tube. Alternatively, the attracting portion is provided by the annular magnet or the alternating magnetic fields created by the pole plates of the stator. The magnetically conductive portion is made of a magnetically conductive material and may be comprised of a disc with two arcuate edges, a casing fixed in a rotor housing of the rotor, an annular plate, a plurality of arcuate plates, or a rotor housing of a spindle motor. The magnetically conductive portion may be provided on the circuit board, an inner periphery of the rotor, or the bottom of the rotor, and associated with the attracting portion. Such a structure is disclosed in, e.g., Taiwan Utility Model Publication Nos. 383818, 422365, 428838 and M241969, U.S. Pat. Nos. 6,097,120; 6,483,209; 6,700,241; and 6,727,626, and U.S. Patent Publication No. 2005/0006962.

When the motor turns, alternating magnetic fields are created by the pole faces of the magnetic pole plates (or pole arms). The magnetically conductive portion is attracted by the attracting portion during rotation of the rotor, thereby maintaining rotational balance of the rotor, avoiding disengagement of the rotor shaft from the stator, reducing rotational friction of the bearing, and prolonging the life of the motor.

It is common to make the size of the metal plate consisting of the magnetically conductive portion as large as possible so as to provide a large area facing the magnet of the attracting portion (such as the annular magnet). This may result in excessive attracting force between the magnetically conductive portion and the attracting portion for balancing the rotor. The fixed portion generally includes a circuit board with at least one Hall element that faces the annular magnet of the rotor for detecting a change in polarity of the annular magnet when the rotor turns. The Hall element is generally fixed on the circuit board by a number of legs that are bent. The Hall element inevitably warps upward and thus could not lie flat on the circuit board. The assembling precision of the Hall element is thus adversely affected. Further, it becomes more and more difficult to mount additional positioning elements on the fixed portion for precisely positioning the Hall element due to the limited assembling space provided by the fixed portion on the trend of miniaturization. The quality of the resultant motors after assembly is not uniform. More specifically, the Hall elements in some of the motors could not provide accurate detection signal. The rotational efficiency of the rotor is adversely affected and the qualified product ratio is lowered.

OBJECTS OF THE INVENTION

An object of the present invention is to provide a balancing structure for improving assembling precision for a sensor while maintaining rotational balance for a rotor of a motor.

Another object of the present invention is to provide a balancing structure for providing an appropriate balancing effect.

SUMMARY OF THE INVENTION

A motor in accordance with the present invention comprises a fixed portion, a rotor, a balancing plate, and at least one sensor mounted on the fixed portion. The fixed portion comprises a stator having at least one winding and at least one pole plate that extends to form a plurality of pole faces. The at least one winding is energizable to make the pole faces create alternating magnetic fields. The rotor includes an annular magnet facing the pole faces of the stator and a shaft rotatably extending through the fixed portion. The balancing plate is mounted on the fixed portion and includes at least two magnetically conductive faces that face at least one face of the annular magnet.

The balancing plate presses against and thus precisely positions a body of the sensor so that the sensor and the annular magnet have a certain distance therebetween while providing an appropriate magnetically attracting balancing effect between the at least two magnetically conductive faces and the annular magnet.

Preferably, the fixed portion further comprises a circuit board on which the at least one sensor is mounted.

Preferably, the circuit board comprises an opening in which the at least one sensor is mounted.

Preferably, the balancing plate is in intimate contact with a top side of the circuit board.

Preferably, the balancing plate further comprises a connecting portion for connecting the at least two magnetically conductive faces.

In an embodiment of the invention, the connecting portion is an outer connecting portion. Each magnetically conductive face extends radially inward from an inner periphery of the outer connecting portion and faces a bottom face of the annular magnet of the rotor. Preferably, a notch is defined between a pair of the at least two magnetically conductive faces adjacent to each other. The notches and the at least two magnetically conductive faces face the annular magnet of the rotor.

In another embodiment of the invention, the connecting portion is an inner connecting portion. Each magnetically conductive face extends radially outward from an outer periphery of the inner connecting portion and faces a bottom face of the annular magnet of the rotor. Preferably, a notch is defined between a pair of the at least two magnetically conductive faces adjacent to each other. The notches and the at least two magnetically conductive faces face the annular magnet of the rotor.

Preferably, the fixed portion comprises an axial tube, and the inner connecting portion comprises a central hole and mounted around the axial tube of the fixed portion.

The stator may include radial winding or axial winding.

Other objects, advantages and novel features of this invention will become more apparent from the following detailed description when taken in conjunction with the accompanying drawings.

DETAILED DESCRIPTION OF THE PREFERRED EMBODIMENTS

Figure 1:
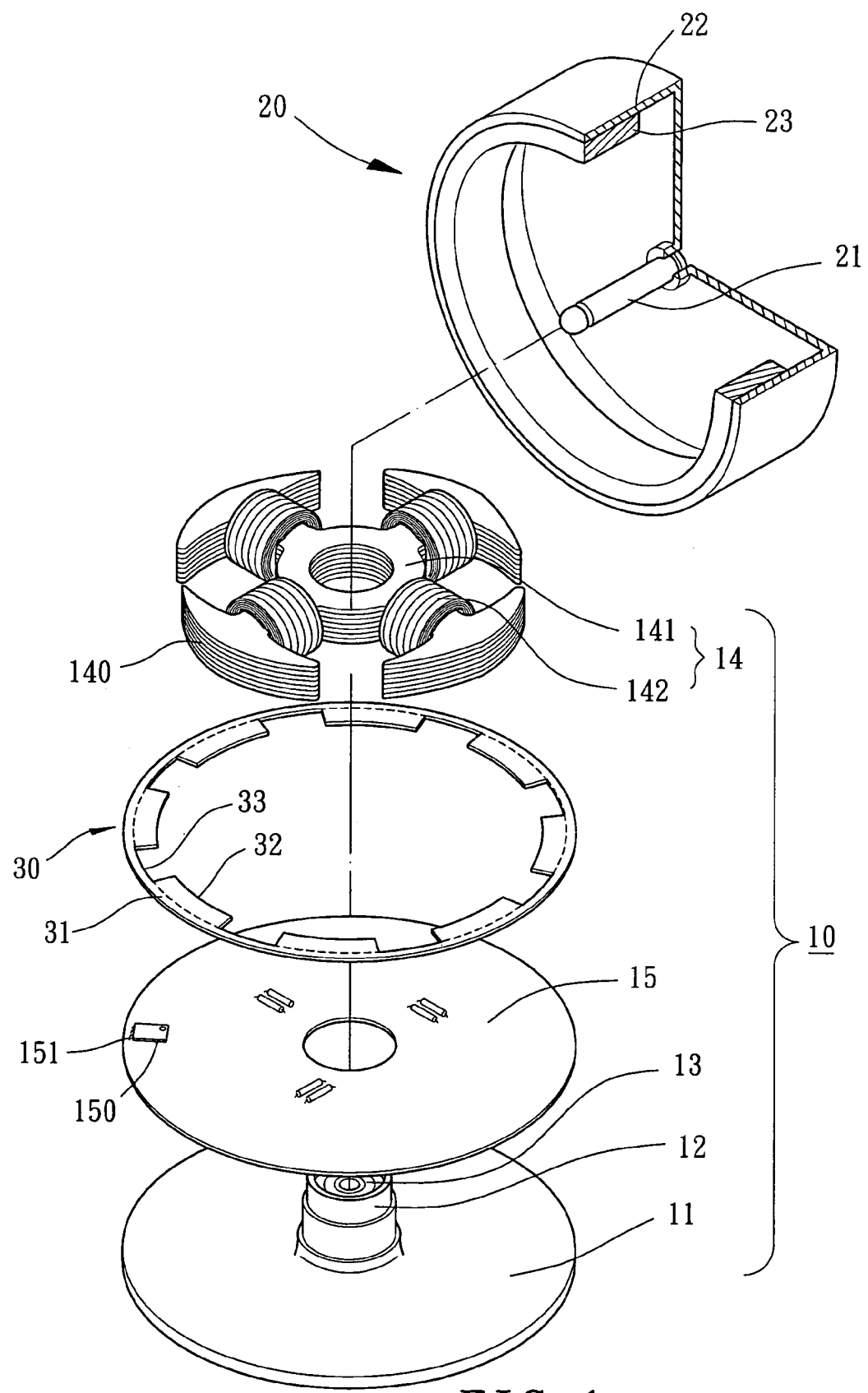
FIG. 1 is an exploded perspective view of a first embodiment of a motor in accordance with the present invention.

Referring to FIG. 1, a first embodiment of a motor in accordance with the present invention comprises a fixed portion 10, a rotor 20, and a balancing plate 30. The motor can be used as a motor for a heat-dissipating fan or a spindle motor for an optical disk drive, and particularly suitable for a miniature brushless D.C. motor.

Figure 2:
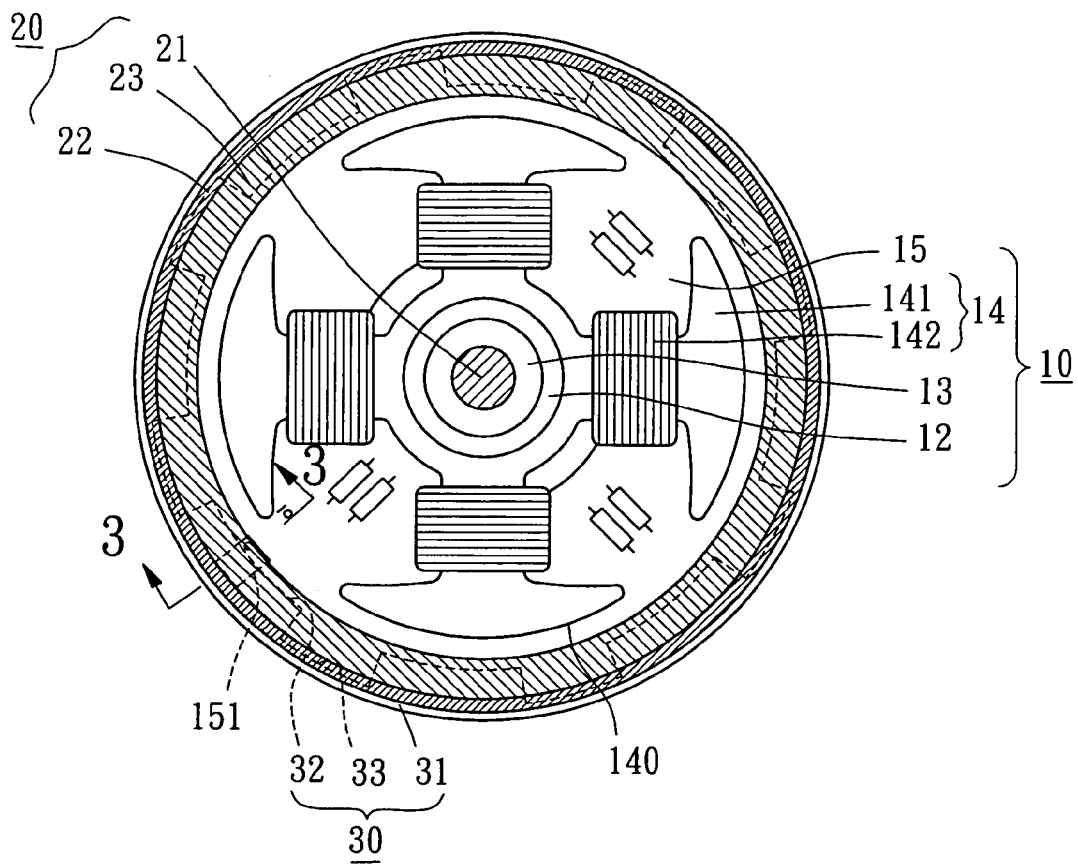
FIG. 2 is a sectional view of the motor in FIG. 1.

Referring to FIGS. 1 and 2, the fixed portion 10 includes a base 11, an axial tube 12, a bearing 13, a stator 14, and a circuit board 15. The base 11 may be coupled to a casing (not shown) of the motor. The axial tube 12 is fixed on or integrally formed with the base 11. At least one bearing 13 is mounted in the axial tube 12 whereas as the stator 14 and the circuit board 15 are mounted around the axial tube 12. The bearing 13 may be an oily bearing, ball bearing, fluid dynamic bearing, or magnetic bearing.

The stator 14 may be a stator with radial winding or axial winding. In the illustrated embodiment, the stator 14 includes four pole plates 141 each having a winding 142 wound therearound along a radial direction. The pole plates 141 extend radially to form a plurality of pole faces 140.

The circuit board 15 includes an opening 150 for mounting at least one sensor 151 (such as a Hall element). The sensor 151 includes a body of an IC package and is electrically connected to a control circuit of the circuit board 15 via a plurality of bent legs. The sensor 151 detects the rotational status of the rotor 20, and the directions of the electric current of the windings 142 on the pole plates 141 are alternately controlled by the control circuit of the circuit board 15 such that alternating magnetic fields are created by the pole faces 140 of the pole plates 141.

Still referring to FIGS. 1 and 2, the rotor 20 includes a shaft 21, a housing 22, and an annular magnet 23. An end of the shaft 21 is fixed to a center of an end wall of the housing 22, with the other end of the shaft 21 rotatably extending through the bearing 13. The annular magnet 23 is mounted to an inner periphery of the housing 22. The annular magnet 23 includes a plurality of alternately disposed north pole sections (not shown) and south pole sections (not shown) on an inner periphery thereof, with the pole faces 140 of the stator 14 facing the north and south pole sections. Thus, the annular magnet 23 induces the alternate energizing of the pole faces 140 to drive the rotor 20 to turn.

Figure 3:
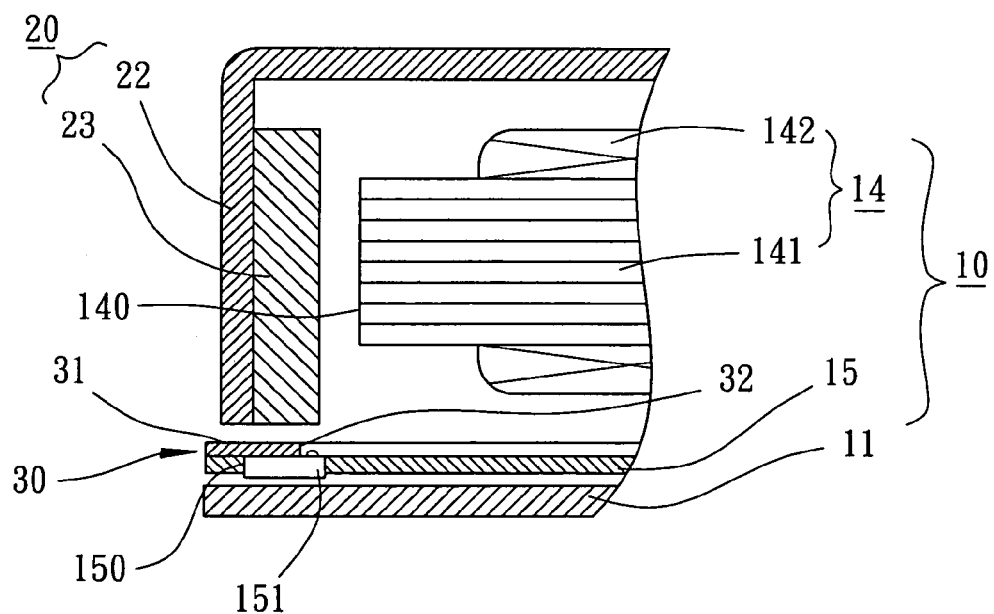
FIG. 3 is a sectional view taken along plane 3-3 in FIG. 2.

Referring to FIGS. 1 through 3, the balancing plate 30 is substantially a ring-like plate made of a magnetically conductive material such as iron. The balancing plate 30 includes an outer connecting portion 31, a plurality of magnetically conductive faces 32 (eight in this embodiment), and a plurality of notches 33 (eight in this embodiment). The outer connecting portion 31 and the magnetically conductive faces 32 are integrally formed.

The magnetically conductive faces 32 extend radially inward from an inner periphery of the outer connecting portion 31. Alternatively, the magnetically conductive faces 32 extend in a longitudinal direction parallel to a longitudinal axis of the balancing plate 30. Each notch 33 is defined between a pair of the magnetically conductive faces 32 adjacent to each other.

The balancing plate 30 is securely mounted on the fixed portion 10 and preferably in intimate contact with a top side of the circuit board 15. In assembly, the magnetically conductive faces 32 preferably face a bottom face or an inner periphery of the annular magnet 23 of the rotor 20. In particular, the magnetically conductive faces 32 or the outer connecting portion 31 of the balancing plate 30 press against and thus position the body of the sensor 151 to avoid undesired upward warping of the body of the sensor 151.

After assembly, as illustrated in FIGS. 2 and 3, the magnetically conductive faces 32 of the balancing plate 30 are fixed on the fixed portion 10 and face the bottom face (or the inner periphery) of the annular magnet 23. When the rotor 20 turns, the annular magnet 23 attracts the magnetically conductive faces 32 to create a magnetically attracting balancing force for effectively avoiding shaking, vibration, and wobbling of the rotor 20, thereby maintaining rotational balance and rotational stability of the rotor 20.

Provision of the notches 33 between the magnetically conductive faces 32 avoids creation of excessive magnetically attracting balancing force and thus avoids excessive effect on the rotational efficiency of the rotor 30. Of more importance, the magnetically conductive faces 32 (or the outer connecting portion 31) of the balancing plate 30 press against the body of the sensor 151 and thus avoid undesired upward warping of the body of the sensor 151. Precise positioning of the sensor 151 can be achieved while providing a certain distance between the sensor 151 and the annular magnet 23. The output detection signal is stable and the assembling precision is improved.

Figure 4:
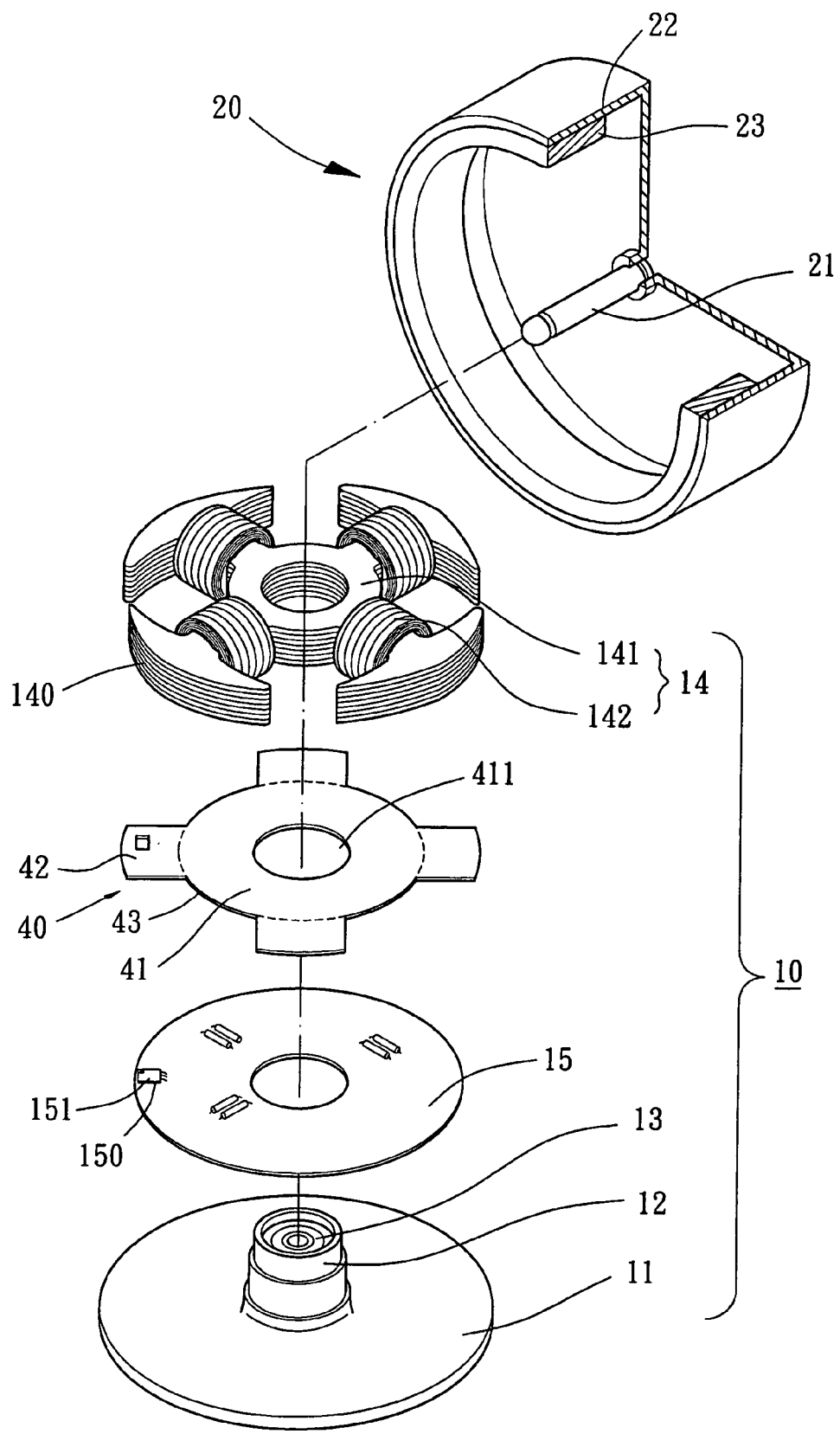
FIG. 4 is an exploded perspective view of a second embodiment of the motor in accordance with the present invention.
Figure 5:
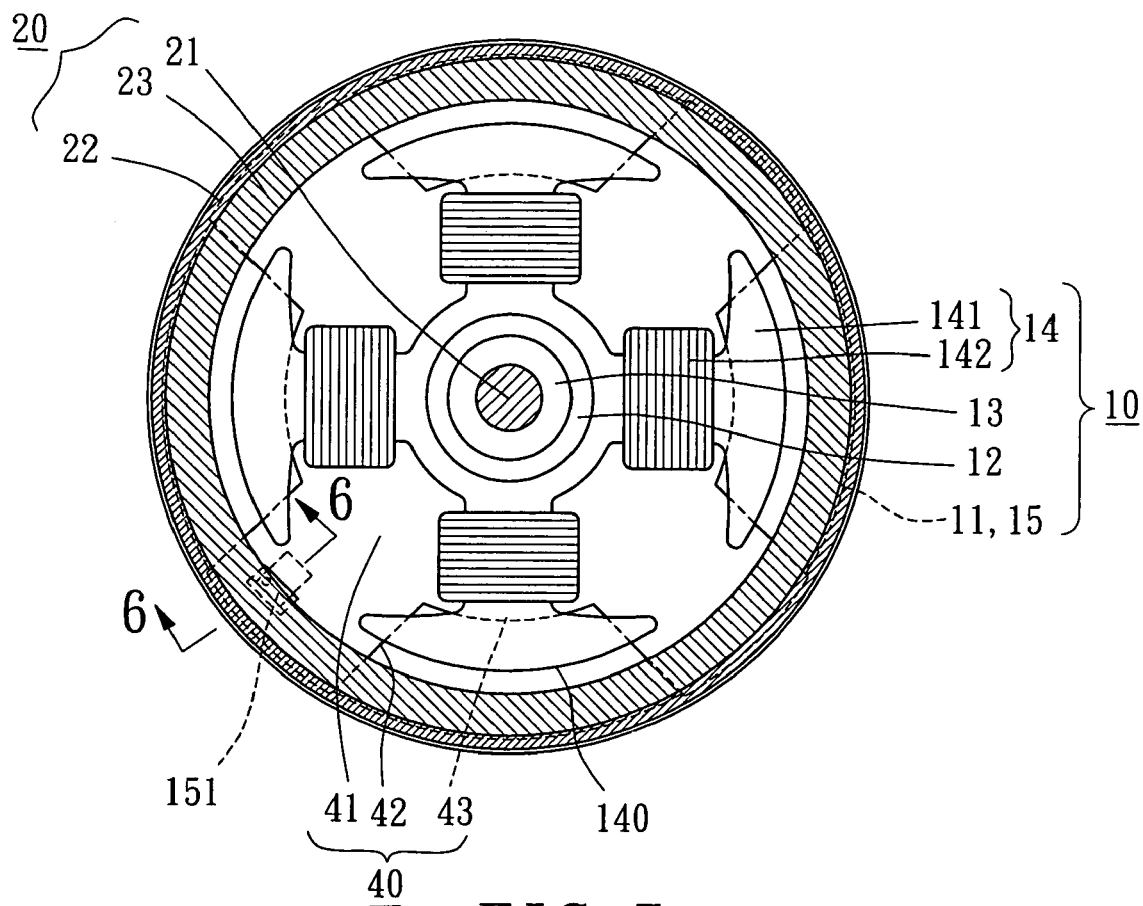
FIG. 5 is a sectional view of the motor in FIG. 4.
Figure 6:
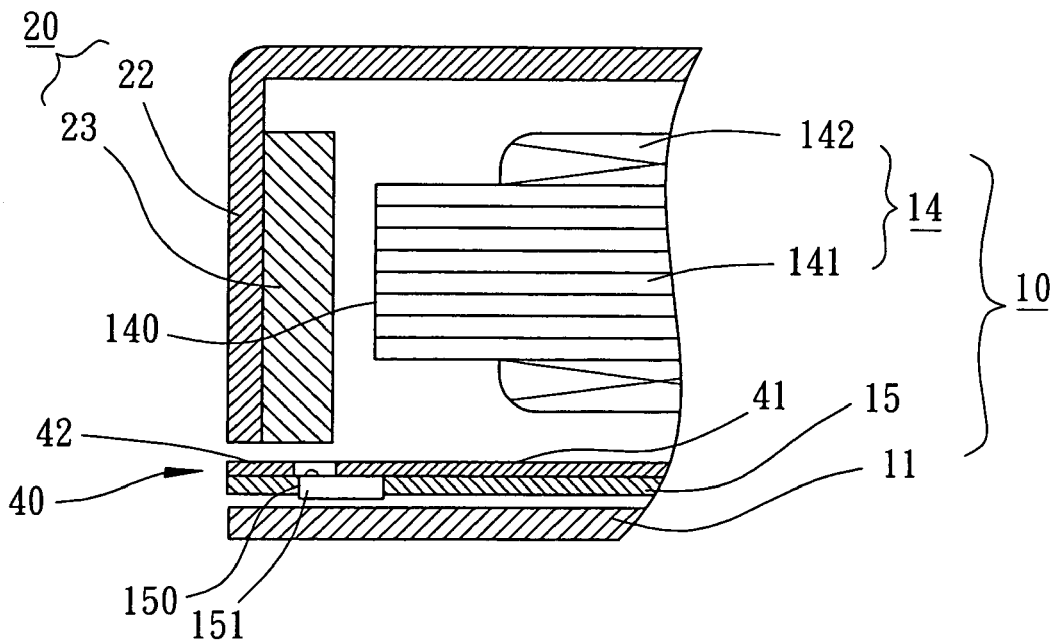
FIG. 6 is a sectional view taken along plane 6-6 in FIG. 5.

FIGS. 4 through 6 illustrate a second embodiment of the invention. In this embodiment, the balancing plate 40 includes an inner connecting portion 41, a plurality of magnetically conductive faces 42 (four in this embodiment), and a plurality of notches 43 (four in this embodiment). The inner connecting portion 41 and the magnetically conductive faces 42 are integrally formed. The inner connecting portion 41 includes a central hole 411 so as to be mounted around the axial tube 12 of the fixed portion 10.

The magnetically conductive faces 42 extend radially outward from an inner periphery of the inner connecting portion 41. Alternatively, the magnetically conductive faces 42 extend in a longitudinal direction parallel to a longitudinal axis of the balancing plate 40. Each notch 43 is defined between a pair of the magnetically conductive faces 42 adjacent to each other.

The balancing plate 40 is preferably in intimate contact with a top side of the circuit board 15. In assembly, the magnetically conductive faces 42 preferably face a bottom face or an inner periphery of the annular magnet 23 of the rotor 20. In particular, the magnetically conductive face 42 or the inner connecting portion 41 of the balancing plate 40 press against and thus position the body of the sensor 151 to avoid undesired upward warping of the body of the sensor 151.

Still referring to FIGS. 4 through 6, when the rotor 20 turns, the annular magnet 23 attracts the magnetically conductive faces 42 to create a magnetically attracting balancing force for effectively avoiding shaking, vibration, and wobbling of the rotor 20, thereby maintaining rotational balance and rotational stability of the rotor 20.

Provision of the notches 43 between the magnetically conductive faces 42 avoids creation of excessive magnetically attracting balancing force and thus avoids excessive effect on the rotational efficiency of the rotor 30. Of more importance, the magnetically conductive faces 42 (or the inner connecting portion 41) of the balancing plate 40 press against the body of the sensor 151 and thus avoid undesired upward warping of the body of the sensor 151. Precise positioning of the sensor 151 can be achieved while providing a certain distance between the sensor 151 and the annular magnet 23. The output detection signal is stable and the assembling precision is improved.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A motor comprising:
    a fixed portion including a stator, the stator including at least one winding and at least one pole plate that extends to form a plurality of pole faces, said at least one winding being energizable to make said pole faces create alternating magnetic fields;
    a rotor including a shaft rotatably extending through the fixed portion and an annular magnet facing the pole faces of the stator;
    at least one sensor mounted on the fixed portion and having a body; and
    a balancing plate mounted on the fixed portion, the balancing plate including at least two magnetically conductive faces that face at least one face of the annular magnet, and a connecting portion to connect said at least two magnetically conductive faces, said connecting portion being an outer connecting portion having an inner periphery, each said magnetically conductive face extending radially inward from the inner periphery of the outer connecting portion and facing a bottom face of the annular magnet of the rotor;
    the balancing plate pressing against and thus precisely positioning the body of the sensor so that the sensor and the annular magnet have a certain distance therebetween while providing a magnetically attracting balancing effect between the at least two magnetically conductive faces and the annular magnet.

2. The motor as claimed in claim 1, wherein the fixed portion further comprises a circuit board on which said at least one sensor is mounted.

3. The motor as claimed in claim 2, wherein the circuit board further comprises an opening in which said at least one sensor is mounted.

4. The motor as claimed in claim 2, wherein the circuit board comprises a top side, and wherein the balancing plate is in intimate contact with the top side of the circuit board.

5. The motor as claimed in claim 1, wherein a notch is defined between a pair of said at least two magnetically conductive faces adjacent to each other, the notches and said at least two magnetically conductive faces facing the annular magnet of the rotor.

6. The motor as claimed in claim 1, wherein the connecting portion is an inner connecting portion having an outer periphery, each said magnetically conductive face extending radially outward from the outer periphery of the inner connecting portion and facing a bottom face of the annular magnet of the rotor.

7. The motor as claimed in claim 6, wherein a notch is defined between a pair of said at least two magnetically conductive faces adjacent to each other, the notches and said at least two magnetically conductive faces facing the annular magnet of the rotor.

8. The motor as claimed in claim 6, wherein the fixed portion comprises an axial tube, and wherein the inner connecting portion comprises a central hole and mounted around the axial tube of the fixed portion.

9. The motor as claimed in claim 1, wherein the stator comprises one of radial winding and axial winding.

* * * * *